Feb. 25, 1941.                    H. NOVACK                    2,233,027
                            REINFORCED BIRD'S NEST
                             Filed March 20, 1939
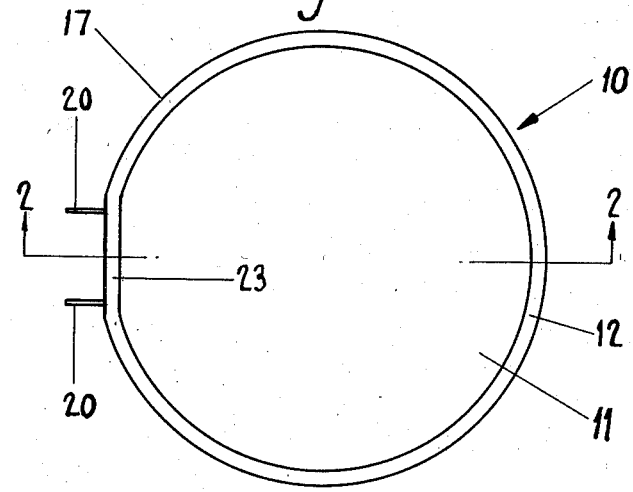
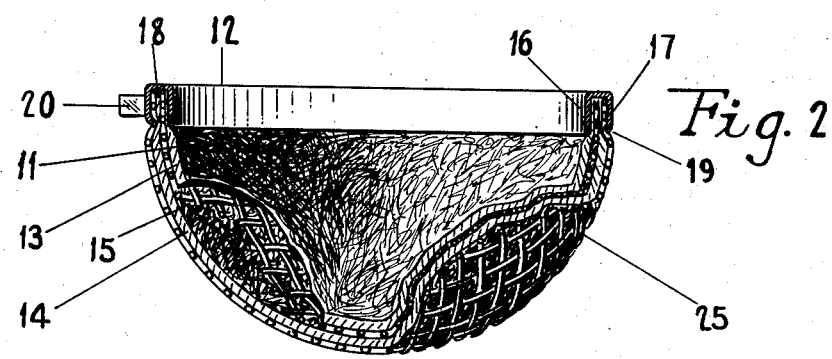
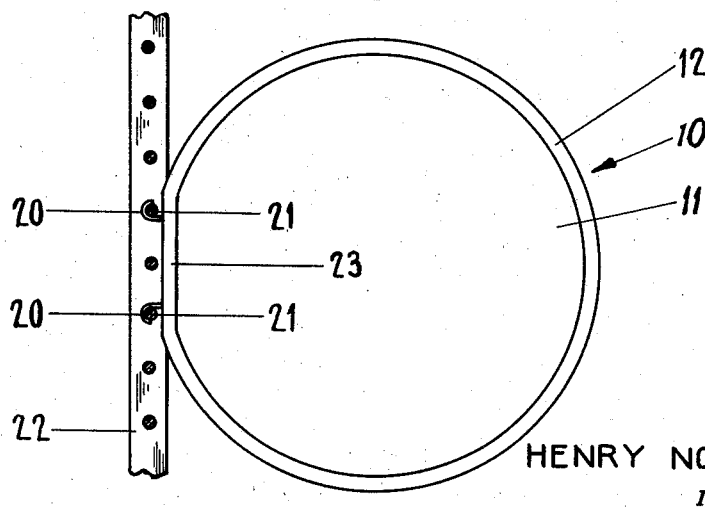
HENRY NOVACK
INVENTOR.
BY Joseph Blacker
ATTORNEY.

Patented Feb. 25, 1941

2,233,027

UNITED STATES PATENT OFFICE 2,233,027

REINFORCED BIRD'S-NEST

Henry Novack, Brooklyn, N. Y.

Application March 20, 1939, Serial No. 262,981

2 Claims. (Cl. 119—45)

This invention relates to bird's-nests and particularly to a double reinforced nest designed to be mounted in connection with bird cages and which is adapted for use in the breeding of birds, such as canaries and is an improvement on my Bird Nest, Serial No. 189,339 filed February 8, 1938, Patent No. 2,165,295, issued July 11, 1939.

An object of this invention is to provide a nest pressed from fibrous materials, comprising two layers of feltable fibres and having an intermediate and an outer reinforcing fabric layer made of fairly wide mesh burlap.

Another object of this invention is to provide a composite nest comprising an annular metallic housing having an annular recess designed to receive the upper edge portion of a nest pressed from fibrous materials and of substantially semi-spherical cross-section.

Another object of this invention is to provide, in conjunction with my composite bird's-nest, the said housing comprising two tongues adapted to be bent around the vertical bars of a bird cage to effectively hold the nest to the cage.

Another object of this invention is to provide a hollow annular housing having an inner wall of wider extent than the outer wall and to bend the lower edge of the outer wall inwardly for clamping the said housing to the nest body.

Another object of this invention is to provide a loosely felted bird's-nest having a net-like outer covering layer circumscribing the nest and forming a protective means acting as a deterrent to pecking and the destruction of the outer face of the nest.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a plan view of my bird's-nest.

Figure 2 is a cross-sectional view, the section being taken as on line 2—2 in Figure 1, a portion of the nest body being broken away to show that it is made up of four layers.

Figure 3 is a plan view of my nest installed in a bird cage by bending two tongues around two vertical bars of the cage.

Figure 4 is a side view of the housing.

In the illustrated embodiment of the invention, the numeral 10 indicates a bird's-nest comprising a nest body 11 of substantially semi-spherical cross-section and an annular housing 12 preferably made of sheet metal.

The nest body 11 comprises two layers 13 and 14 of loosely felted animal hair, an intermediate layer 15 and an outer net-like layer 25 of loosely woven fabric such as burlap having a fairly wide mesh. The loosely felted layers of hair are held together in unitary relation with the burlap fabric layers in any suitable manner. The layers 13 and 14 are stiffened and strengthened by the said intermediate layer. The semi-spherical form of the nest body 11 may be produced by molding and stretching between dies under pressure. The outer net-like layer 25 is preferably made of burlap but may be made of other materials having comparatively large size interstices or openings in the body thereof.

The annular housing 12 is of inverted substantially U-shaped cross-section and comprises an inner wall 16 and an outer wall 17. The inner wall 16 is preferably of wider extent than the outer wall and extends to a lower elevation than the outer wall. The housing 12 has an annular recess 18 designed to receive the upper edge portion of the nest body. When the nest body 11 is inserted into the annular recess 18, the lower edge 19 of the outer wall 17 is in-turned all around and forced radially inwardly of the nest and enters the outer layer and clamps the housing 12 and nest body 11 in unitary relation. It is to be noted that instead of the inner wall 16 being the wider wall, the outer wall 17 may be the wider wall.

As shown in Figures 1 and 4, the outer wall 17 of the housing 12 has two tongues 20, 20 pressed therefrom. As shown in Figure 3 the tongues 20 have been bent around two vertical bars 21, 21 extending from a horizontal rail 22 of a bird cage and serve to effectively hold the nest 10 to the cage. The housing 12 has a flattened portion 23 to facilitate alinement with the bars 21 of the cage. It is to be noted that instead of pressing the tongues 20 from the housing 12, I may spot weld a substantially U-shaped metallic member to the housing 12 to provide two projecting tongues.

It is to be noted that when a bird occupies the nest 10, it finds comparatively loose hair which it can extract from the inner layer 13 for building or augmenting the nest, and, while the continual removal of hair may form a hole in the inner layer, the nest remains serviceable because the bird has sufficient nest making material to draw upon from the inner layer of loose fibres and if it should want to go deeper the hard burlap layer acts as a deterrent so that under practical conditions the felted layer 14 is without any tendency to destructive actions by the bird.

It is to be noted that my nest body may be used as a lining inside any type of nest and be removably mounted therein. It is also to be noted that the importance of circumscribing the loosely felted nest body with a net-like covering of material such as burlap is first to deter the bird from destroying the outer loosely felted layer of the nest body. Furthermore this construction makes it possible to saturate the burlap layer only with a chemical offensive to mites before its application to the loosely felted fibres. This chemical prevents mites from accumulating in or around the nest due to the odor of the said chemical. This chemical when used on the outer burlap layer will not penetrate the loosely felted fibers and will not tend to destroy life inside the nest, such as eggs during the hatching period, and young birds just hatched and that are of a growing age. The nest will be mite proof because the odor will be offensive to mites and will prevent the mites from accumulating in or around the nest.

In practice, I have found that when a chemical such as a solution of pine tar was sprayed on the outer loosely felted fiber layer before molding, that the heated mold created steam from the said chemical and this steam penetrated to the interior layer of the loosely felted animal hair. During the hatching period the heat from the canary causes the chemical to penetrate the porous eggs and causes destruction of life due to exposure to said chemical inside the nest.

It is to be noted that when the nest body 11 is used as a lining inside a bird's-nest of any conventional type, that the upper edge portion of the body 11 will preferably be covered with a fabric binding which may be stitched while folded over the inner and outer faces of the nest body. The said fabric will preferably be of a washable nature so that excreta deposited on said covering fabric by the birds will be readily removable by washing. The said fabric covering will then be of substantially U-shaped cross-section similar to that of the housing 12.

In accordance with the provisions of the patent statutes I have described the operation of my invention, together with the form which I now consider to represent the best embodiment thereof; but I desire to have it understood that the device shown is only illustrative and that the invention may be carried out by other means within the scope of the appended claims.

I claim:

1. In a composite bird's-nest of substantially semi-spherical cross-section, comprising loosely felted layers of hair, an external protective net-like burlap layer of sufficient hardness to act as a deterrent to pecking said loosely felted hair, said external protective layer circumscribing said nest and being coarsely woven to provide substantially large openings therethrough, said external protective layer being made of saturable fibers and being saturated with a pine tar offensive to mites without penetrating and chemically affecting the felt of said nest body, and means for securing the upper edge portion of said loosely felted layers of hair and said external protective layer in unitary relation.

2. In a composite bird's-nest of substantially semi-spherical cross-section, comprising loosely felted layers of hair, an external protective net-like burlap layer of sufficient hardness to act as a deterrent to pecking said loosely felted hair, said external protective layer being of semi-spherical cross-secton and in circumscribing relation with said nest and being coarsely woven to provide substantially large openings therethrough, said external protective layer being made of saturable fibers and being saturated with a chemical offensive to mites without penetrating and chemically affecting the felt of said nest body, and means for securing the upper edge portion of said loosely felted layers of hair and said external protective layer in unitary relation, said securing means being of annular form and of U-shaped cross-section and being designed to entirely conceal the upper portion of said nest and to partly conceal the inner and outer surfaces of said nest at said upper edge.

HENRY NOVACK.